United States Patent [19]

Wetmore

[11] 4,206,786
[45] Jun. 10, 1980

[54] HEAT RECOVERABLE ARTICLE WITH FUSIBLE MEMBER

[75] Inventor: Judson D. Wetmore, San Diego, Calif.

[73] Assignee: Raychem Corporation, Menlo Park, Calif.

[21] Appl. No.: 561,259

[22] Filed: Mar. 24, 1975

Related U.S. Application Data

[60] Continuation of Ser. No. 499,923, Oct. 21, 1965, abandoned, which is a division of Ser. No. 211,747, Jul. 23, 1962, Pat. No. 3,243,211.

[51] Int. Cl.² ............................ F16L 9/12; F16L 9/22
[52] U.S. Cl. ..................................... 138/178; 138/137; 138/140; 138/99; 428/36; 428/913; 174/DIG. 8
[58] Field of Search ................. 138/178, 137, 99, 140; 228/56; 277/9; 264/230; 403/273; 174/90, DIG. 8; 53/39; 156/294; 285/DIG. 10; 248/350; 428/913, 36; 222/512; 339/276; 215/270

[56] References Cited

U.S. PATENT DOCUMENTS

| | | | |
|---|---|---|---|
| 623,334 | 4/1899 | Perkins | 222/512 |
| 1,815,418 | 7/1931 | O'Bryan | 277/9 |
| 1,864,200 | 6/1932 | Kaufmann | 248/350 X |
| 2,027,962 | 1/1936 | Currie | 156/294 X |
| 2,109,517 | 3/1938 | Xenis | 403/20 |
| 2,790,285 | 4/1957 | Pike et al. | 53/39 |
| 2,823,250 | 2/1958 | O'Keefe | 339/276 X |
| 2,831,446 | 4/1958 | Schwartz | 228/56 |
| 3,235,944 | 2/1966 | Broske et al. | 174/90 X |
| 3,243,211 | 3/1966 | Wetmore | 138/178 X |
| 3,247,315 | 4/1966 | Miller | 174/90 X |

*Primary Examiner*—Richard E. Aegerter
*Assistant Examiner*—James E. Bryant, III
*Attorney, Agent, or Firm*—Lyon & Lyon

[57] ABSTRACT

Described herein are heat recoverable articles comprising a recoverable member held in a deformed condition by a fusible member. When the fusion temperature of the fusible material is exceeded, the recoverable member is able to move in a direction toward that from which it was deformed. The recoverable member may be, for example, an elastomeric member held in a deformed state or a spring member held in a deformed state.

7 Claims, 12 Drawing Figures

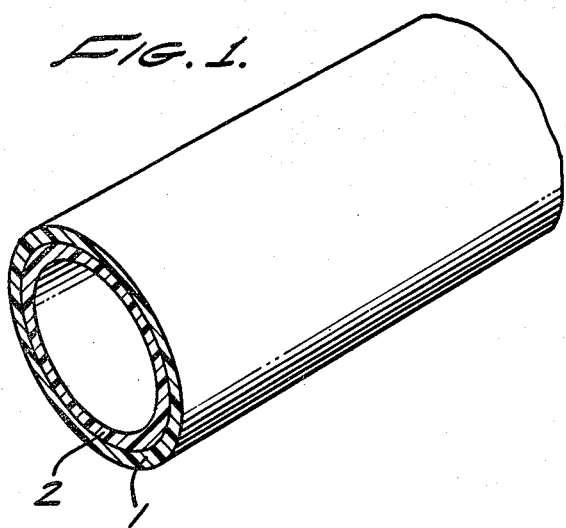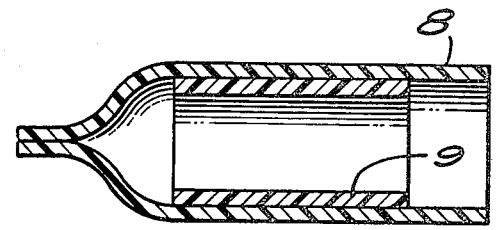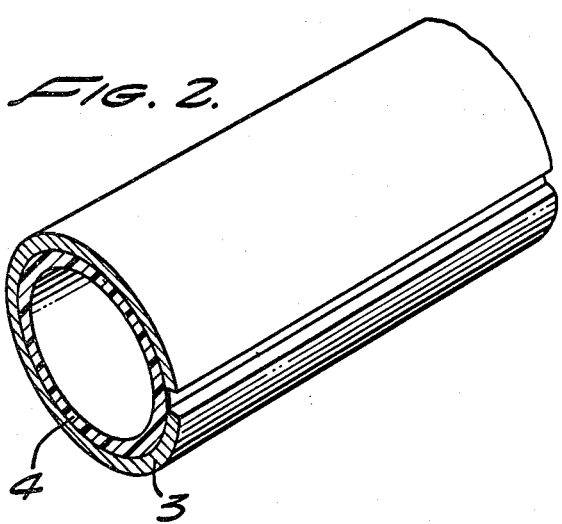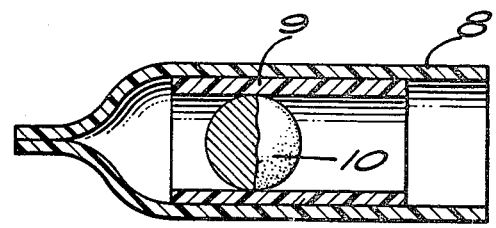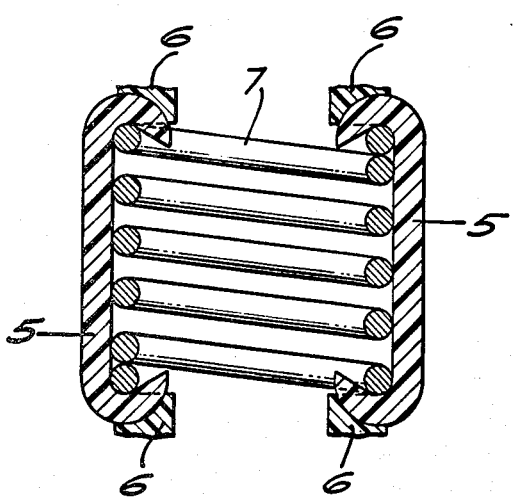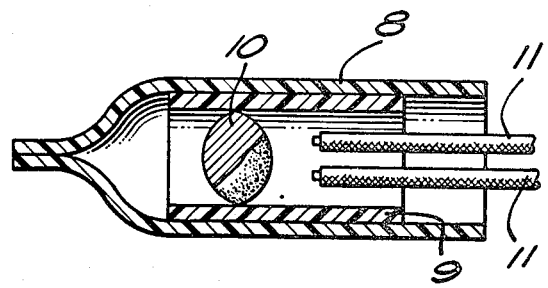

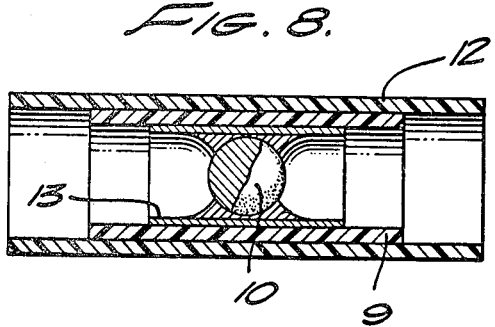
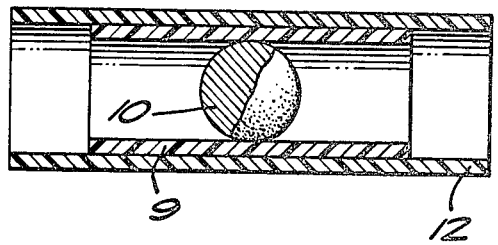
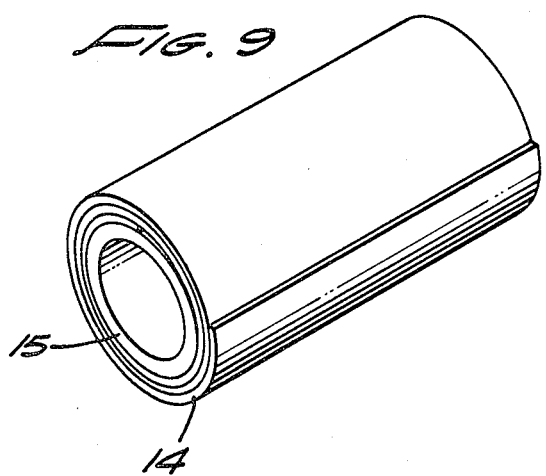
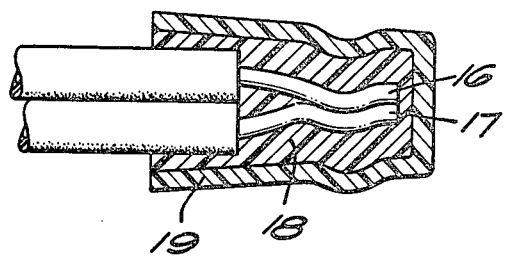
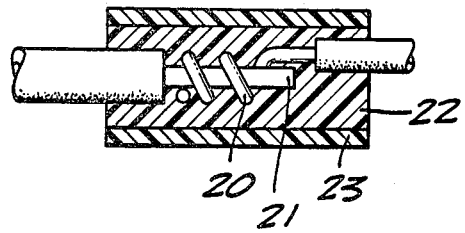
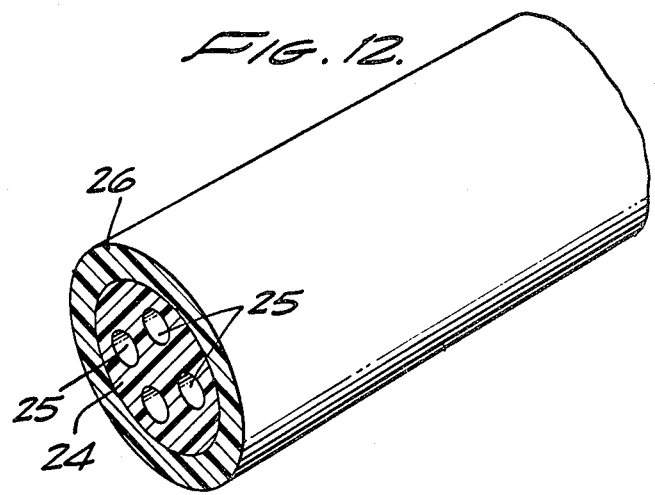

HEAT RECOVERABLE ARTICLE WITH FUSIBLE MEMBER

This is a continuation of application Ser. No. 499,923, filed Oct. 21, 1965, now abandoned, which is a divisional of my copending application Ser. No. 211,747, filed July 23, 1962, now U.S. Pat. No. 3,243,211, entitled ARTICLE AND PROCESS.

The present invention relates to articles which are capable of changing shape and which contain a fusible insert. The present invention includes within its scope articles in which the fusible insert operates to restrain the recoverable portion of the article against recovery and articles in which the fusible insert does not restrain the recoverable portion of the article against recovery.

It has long been known that recoverable articles are useful for covering other articles. For example, elastic rubber sleeves have often been used to cover cylindrical articles merely by choosing a sleeve which, in its relaxed condition, has a diameter less than that of the article to be covered. The tendency of the sleeve to retract when it has been expanded and placed over the article results in a covering for the article which, for some few purposes, is satisfactory. Heat recoverable articles have also been used in a somewhat similar manner. An example of such a heat recoverable member is found in U.S. Pat. No. 2,027,962, issued Jan. 14, 1936 to Currie.

However, the recoverable articles known to the prior art have been found to be completely unsatisfactory in the many instances when a strong and impervious bond between the recoverable article and the article which is to be covered is desired. For example, it is common practice to laminate an insulating covering over electrical components such as conductors. The insulating material must, of course, be securely bonded to the conductor in order to protect the conductor from water or air or other media with which it may come into contact. Furthermore, it is also highly important that there be no air spaces between the covering and the conductor. The occurrence of air spaces is particularly troublesome where the insulating material is applied to an element having an irregular surface, such as a plurality of wires which have been twisted together to form a cable or braided structure. Thus, as is well known to those skilled in the art, there has been a long standing need for coverings which are easy to apply, such as recoverable articles, and yet are capable of forming a secure, intimate, imprevious bond with the article which is covered.

The present invention satisfies this long standing need in a surprisingly simple and economic manner.

One of the principal objects of the present invention is to provide a recoverable article capable of being laminated or otherwise united with another article in such a manner that a secure, intimate and impervious bond is formed and the process of so doing.

Another object of the present invention is to provide a heat recoverable article capable of being laminated or otherwise united with another article in such a manner that a secure, intimate and impervious bond is formed and the process of so doing.

A further object of the present invention is to provide a heat recoverable article having elastic memory which is capable of being laminated or otherwise united with another article in such a manner that a secure, intimate and impervious bond is formed and the process of so doing.

It is still another object of the present invention to provide an article and process for forming a laminated or otherwise united insulating covering which is securely, intimately and imperviously bonded to electrical elements.

It is a further object of the present invention to provide a recoverable article having a fusible insert and processes for using this article.

Other objects and advantages of the present invention will become apparent from the following detailed description, when read in conjunction with the drawings, of preferred embodiments of the present invention.

Briefly, the present invention comprises, in part, a recoverable article which is provided with a fusible insert. The recoverable articles of the present invention may comprise elastic materials which have been stretched and are held in the stretched condition, heat recoverable articles, such as articles made from materials having the property of plastic memory, or the like. The fusible inserts of the present invention may comprise any suitable fusible material, e.g., thermoplastics such as polyolefines. Furthermore, the word "insert", as used in the description of the present invention, contemplates any member which is positioned such that it will be interposed between the recoverable material and an article with which the recoverable material is to be laminated or otherwise united. For example, in those instances where a tubular article is to be provided with an inner lining comprising the recoverable material, the insert comprises a fusible outer layer provided on the outer surface of the recoverable material. The process of the present invention comprises forming the recoverable material such that it has a dimension different from that of the article to which it is to be laminated or otherwise united and such that it has the property of being capable of changing its dimensions. The recoverable material is then provided with fusible material which is positioned such that it will be interposed between the recoverable material and the article to which it is to be laminated or otherwise united. The fusible insert is preferably in abutting relation to the recoverable member. The article of the present invention is then positioned with relation to the article to which it is to be laminated or otherwise united in such relation that change in the dimensions of the recoverable material will cause it to urge the fusible member toward the article to which it is to be attached and cause it to become bonded thereto. The article of the present invention is then subjected to sufficient heat to cause the fusible material to become fluid. In a preferred embodiment of the present invention, where recoverable articles having the property of elastic memory are employed, the application of heat also causes the recoverable material to exercise this property. Furthermore, the preferred embodiment of this invention comprises a recoverable member which is capable of changing its dimensions in response to the application of heat at a given temperature and a fusible member which will become fluid at the same temperature.

In the drawings:

FIG. 1 illustrates an embodiment of the article of the present invention in which the article has a tubular shape.

FIG. 2 illustrates another embodiment of the present invention in which the recoverable member is a split cylinder.

FIG. 3 illustrates still another embodiment of the present invention wherein the recoverable member is mounted on a coil spring.

FIG. 4 illustrates another embodiment of the present invention wherein the recoverable member is closed at one end.

FIG. 5 illustrates another embodiment of the present invention wherein the recoverable member is closed at one end and contains a ball of solder.

FIG. 6 illustrates another embodiment of the present invention wherein the recoverable member is closed at one end and contains a ball of solder and electric conductors.

FIGS. 7 and 8 illustrate embodiments of the present invention which are similar to the embodiments illustrated in FIGS. 5 and 6, respectively, except that the recoverable member is open at both ends.

FIG. 9 illustrates an embodiment of the present invention wherein the recoverable member comprises a spirally wrapped article.

FIG. 10 illustrates an embodiment of the present invention wherein the conductors encapsulated by the article of the present invention have been crimped.

FIG. 11 illustrates an embodiment of the present invention wherein one conductor is spirally wound about another before the conductors are spliced.

FIG. 12 illustrates an embodiment of the present invention wherein the fusible member comprises a longitudinally perforated cylinder.

Referring now to the drawings, FIG. 1 illustrates a preferred embodiment of the present invention wherein the recoverable member 1 and fusible insert 2 are tubular in shape. In a preferred embodiment of the present invention, the recoverable material is a heat recoverable material having the property of elastic memory, such as the materials disclosed in U.S. Pat. No. 2,027,962. When this type of recoverable material is used, the fusible insert may comprise virtually any material capable of being rendered flowable by the application of heat. For example, conventional thermoplastic materials such as polyolefins (polyethylene, polypropylene, etc.), polyamides (e.g., nylon), polyesters (e.g., polyethylene terephthalate, cellulose acetate), and other similar materials. It is, however, to be understood that the present invention is not limited to the use of conventional thermoplastics as the fusible insert. Rather, thermosetting materials such as epoxy resins, polyurethanes, phenolaldehyde condensation products, etc., may also be used. Still further, it is possible to use, in combination with the recoverable material, certain materials which would not operate in precisely the same manner as fusible materials, such as insulating or conductive greases or heat catalyzed adhesives and the like.

In the preferred embodiment wherein the recoverable member is a heat recoverable member having elastic memory properties, the fusible insert 2 may be combined with the recoverable material 1 in any suitable manner. For example, the fusible material may be applied to the recoverable material as a coating or the fusible insert may be formed into a predetermined size such that it will be held by the recoverable member simply by frictional forces, i.e., by a force fit. It will be obvious to those skilled in the art that, when practicing the present invention in accordance with this preferred embodiment, the recoverable member must, in general, be deformed in such a manner that it possesses elastic memory properties before the fusible insert is added. There are several well-known methods according to which recoverable materials may be deformed such that they possess the property of elastic memory. One such method is clearly disclosed in U.S. Pat. No. 2,027,962, which is incorporated herein by reference. As disclosed in this patent, such materials are independently dimensionally heat unstable, i.e., capable of changing dimension to assume a heat stable condition upon the application of heat alone. Thus, unlike that embodiment of the present invention illustrated in FIG. 2 wherein fusible member 4 holds spring 3 under tension, thereby rendering spring 3 heat recoverable when the fusible member 4 is heated to an extent such that it is no longer capable of resisting the compressive force exerted by spring 3, the application of heat will cause the independently dimensionally heat unstable material 1 illustrated in FIG. 1 to change dimension regardless of whether the fusible member 2 is present. Any such method may be used in the practice of the present invention. Ordinarily, the fusible insert is added to the recoverable material after the recoverable material has been caused to assume dimensions in which it has the property of elastic memory. However, the fusible insert of the present invention may be added to the recoverable member in particulate or powder form. When the article of the present invention is heated, the fusible particulate material flows to form an impervious coating. When the fusible material is added to the recoverable material in particulate form, the addition may be performed before or after the recoverable material is deformed such that it possesses the property of elastic memory. Thus, the use of particulate fusible material has the advantage that the article of the present invention may be assembled without causing the recoverable material to assume any given dimensions. The assembled article may then be deformed by the user to the precise extent required by a given purpose for which the article is to be used.

In another embodiment of the present invention, the recoverable material 1 may comprise an elastic material such as natural or synthetic rubber. In this embodiment, the fusible insert must possess sufficient structural strength that it is able to withstand the compressive forces exerted by the recoverable material after it has been distended. According to this embodiment, the fusible insert is first formed to a size different from that of the article to which the article of the present invention is to be laminated or otherwise united. For example, as illustrated in FIG. 1, elastic material 1, which has a diameter smaller than that of insert 2 when it is in the relaxed state, is stretched over insert 2. The combined recoverable material 1 and insert 2 may then be placed over an article to be encapsulated, such as an electric conduit or the like, which is of a diameter substantially the same as, or somewhat larger than, the original relaxed diameter of the recoverable material 1. The encapsulation is accomplished by the application of sufficient heat to fuse or break down the crystalline structure of insert 2, thereby causing insert 2 to lose its rigidity and permitting the recoverable material 1 to contract elastically to approach its original dimension. The result is a highly effective bonding of recoverable material 1 to the encapsulated article. This method may be used for true encapsulation in the sense of fusing the insert 2 to the member to be encapsulated, or may function simply to produce a heat shrinkable elastic tube wherein the rigid insert is used only for the purpose of temporarily maintaining the recoverable material in its expanded condition.

In the embodiment of the present invention illustrated in FIG. 2, the recoverable material is a split-cylinder type spring 3 which is held under tension by rigid fusible insert 4. Spring 3 is illustrated as being made from metal, but it is to be understood that spring 3 may comprise other suitable materials such as plastic or hard rubber. Furthermore, it is also to be understood that the relation of members 3 and 4 may be reversed such that rigid fusible member 4 surrounds spring 3 and holds it under tension. The function of this embodiment of the present invention is essentially the same as that previously described with respect to the use of a stretched elastic material as the recoverable material.

FIG. 3 illustrates an embodiment of the present invention wherein recoverable material 5, which has a circular horizontal cross-section and is provided with fusible material 6 which is suitably bonded, e.g., by adhesive, thereto, holds coil spring 7 in compression. In this embodiment, recoverable material 5 comprises a material possessing the property of elastic memory. When the assembly illustrated in FIG. 3 is heated, the recoverable material 5 releases the compressive forces which it exerts on spring 7. Spring 7 then functions to urge fusible portions 6 into contact with the article with which the assembly is to be united.

FIGS. 4–6 illustrate embodiments of the present invention in which the recoverable material 8 has a closed end. This closed end may be formed by sealing, by appropriate means, one end of a tubular member, or may be formed simply by molding a thimble shaped article. The articles illustrated in FIGS. 4–6 are particularly useful for terminating electrical conduits.

The embodiment illustrated in FIG. 4 is essentially the same as that illustrated in FIG. 1, with the exception that one end of the recoverable member 8, which surrounds fusible member 9, is closed.

In the embodiment illustrated in FIG. 5, a ball of solder and flux 10 is positioned within fusible member 9. Thus, when the assembly illustrated in FIG. 5 is heated, not only is fusible member 9 caused to fuse and recoverable member 8 caused to contract to a smaller diameter, but the ball of solder and flux 10 is also caused to fuse. The solder thus supplements fusible member 9 as an encapsulating material.

In FIG. 6, recoverable member 8 is illustrated as it would appear with fusible member 9, ball of solder and flux 10 and wires 11 inserted therein.

The embodiment illustrated in FIG. 7 is essentially the same as that illustrated in FIG. 5 with the exception that recoverable member 12 is open at both ends.

The embodiment illustrated in FIG. 8 is similar to that illustrated in FIG. 7, with the addition that a rigid sleeve 13, preferably comprising metal, is inserted within fusible member 9. It is preferred that rigid member 13 have an axial dimension less than that of recoverable member 12 and fusible member 9. Thus, when heat is applied to this assembly, the recoverable member contracts down around the sides of rigid member 13. It is to be understood that solder 10 may be omitted from this embodiment.

Since the articles of the present invention are particularly suitable for splicing and terminating the ends of electrical conduits, the procedure for so using the articles of the present invention will be described in some detail.

The embodiment illustrated in FIG. 6 may be used for making a waterproof soldered splice on plastic insulated wire ends. The splice can be accomplished without stripping the wire ends, twisting the wire ends, flexing the wire ends, crimping the wire ends together or other commonly used methods. The fusible member 9 of the article of the present invention should be a material which is capable of fusing or bonding to the plastic insulation on the wire. As shown in FIG. 6, the recoverable article is provided with solder and, if desired, a fluxing material. The unstripped wire ends 11 are pressed against the top of the solder. Heat is then applied to the assembly. High frequency induction heating has been found suitable in those cases where solder is used. When the heat is applied, the recoverable member 8 contracts to encapsulate or surround the fusible material 9 which is melted by the heat. The heat also causes the insulation on the wires to migrate away from the ends thereof, thereby exposing the wires. The heat further causes the solder to fuse around the exposed wires. Upon cooling, a splice which is securely bonded and impervious is obtained.

The embodiment illustrated in FIG. 8 functions in substantially the same manner as that illustrated in FIG. 6, with the exception that the wires, or other objects, to be spliced may be pushed toward each other along the axis of the tube in order to form a butt type or parallel type junction.

As illustrated in FIGS. 1 and 4, the solder may be omitted where it is not necessary, e.g., where soldered wires are being covered. Furthermore, as illustrated in FIG. 7, the sleeve 13 may be omitted if the structural strength which it imparts is not required.

In those instances where the recoverable member of the article of the present invention is to be tubular in shape, the tube may be extruded, molded or fabricated from a flat sheet of material simply by rolling it into a tube and suitably sealing the seam. Where greater compressive force is desired than that which may be obtained with a single layer of recoverable material, the flat sheet may be rolled into a tube in such a manner that a series of spirally wound layers are formed as illustrated in FIG. 9. The compressive forces exerted by the spirally wound layers 14 on fusible member 15 are substantially greater than those exerted by a single layer of recoverable material.

In those instances where the article of the present invention is used to splice electric conductors and in which it is desired to omit the solder, e.g., the embodiments illustrated in FIGS. 1 and 4, it has been found desirable, as illustrated in FIG. 10, to apply crimping force to the spliced conductors 16 and 17 at the point where the exposed conductors are in contact with each other. The crimping assures that an effective connection is made between the conductors. The crimping may, of course, be performed either before or after the article of the present invention comprising fusible member 18 and recoverable member 19, is used to splice the connectors.

As illustrated in FIG. 11, particularly where a splice is to be made without the use of solder, the insulation may be stripped from one of the conductors 20 for sufficient length to expose a portion of the conductor which is long enough to be spirally wrapped around the exposed portion of the other conductor 21. After the spiral winding is performed, the article of the present invention, comprising fusible member 22 and recoverable member 23, may then be used to effect the splice in any of the manners described herein.

Where a plurality of conductors are to be spliced independently, or where a plurality of articles are to be independently encapsulated, the embodiment of the present invention illustrated in FIG. 12 may be used. In this embodiment, fusible member 24 is provided with a plurality of perforations 25. When heat is applied to the article, recoverable member 26 will contract and fusible member 24 will become flowable. Thus, individual articles which are to be spliced or encapsulated may be positioned in perforations 25 and heat then applied to assembly. This embodiment of the present invention has the distinct advantage that the possibility of voids or air spaces occurring between the articles positioned in perforations 25 is substantially eliminated.

It will be readily apparent to those skilled in the art that the devices of the present invention have numerous and varied uses. For example, they may be used to join two or more pieces of metal and/or plastic together, for joining two or more cylindrical or square pieces of tubing together, for joining two or more pieces of tubing or rod or combinations thereof together, for the application of casters to chair legs, and for sealing bottle caps or for sealing covers on containers. Furthermore, these articles may be used for lamination in general, for connection of any two similarly shaped objects, for forming a moisture proof covering on one or more objects, for making a chemical resistant covering for one or more objects, as well as for splicing, encapsulating, etc., of electrical elements.

It will be obvious to those skilled in the art that many variations of the fundamental concepts previously described are possible without departing from the scope of the present invention. For example, the articles of the present invention may have any desired configuration. The configuration of the articles of the present invention will, in most cases, be determined by the shape of the articles to which they are to be laminated or otherwise united. Furthermore, although the foregoing description has described in most detail those embodiments in which the recoverable member is caused to assume a final dimension less than that which it possesses in the recoverable state, it is to be understood that the present invention is equally applicable to recoverable members which expand rather than contract. For example, by providing a tubular recoverable member with a fusible member which surrounds the recoverable member, an article which is particularly suitable for the lining of tubular members such as pipes is produced. The expandable recoverable article of the present invention is, for example, positioned within a pipe which it is desired to line, and heat is applied to the article. The article of the present invention is thus caused to expand in diameter and the fusible material is caused to become flowable. The resultant product is a pipe which has been provided with a securely bonded lining of the recoverable material.

The recoverable member of the present invention may comprise an irradiated or chemically cross-linked polymeric material. Polyolefines are a particularly suitable type of polymeric material for this type of recoverable material. The polymeric material is first extruded or otherwise molded into a desirable shape. The polymeric material is then cross-linked or given the properties of cross-linked material by exposure to ultra-violet radiation or high energy radiation, e.g., a high energy electron beam, or by chemical means, e.g., peroxides when polyolefines are used. The cross-linked polymeric material is then heated and deformed, and then locked in that condition by quenching or other suitable cooling means or, in the alternative, the same process can be accomplished at room temperature by using greater force to deform the polymeric material. The deformed material will retain its shape almost indefinitely until exposed to a temperature above its crystalline melting temperature, e.g., approximately 250° F. in the case of polyethylene.

Other materials which have been found to be particularly satisfactory for use in the present invention are heat recoverable elastomeric materials and polytetrafluoroethylene. In general, any material possessing the property of elastic memory (sometimes referred to as plastic memory), as well as other recoverable materials, such as elastic or rubbery materials, may be used in the practice of the present invention.

It will be apparent to those skilled in the art that the recoverable article of the present invention may be formed into a variety of shapes which will result in various flow patterns of the fusible material or, if it used, the solder. Furthermore, the recovery of the recoverable member may be controlled by the insertion of rigid members in the articles of the present invention in order to cause the recoverable material to recover in a desired manner. For example, a coil spring may be embedded in either the recoverable member or the fusible member or attached merely by the tension exerted by the spring itself such that the recoverable material will cause the spring to become elongated, compressed or a combination of both. Still further, the recovery of the recoverable member may be controlled by differential heating such that one portion of the member will undergo a greater change in dimension than another portion. The heating described in the present application may be a positive application of heat, e.g., radiation heating, induction heating, electric resistance heating, heat generated by an exothermic reaction, etc., or may constitute the exposure of refrigerated materials to atmospheric, or lower, temperatures. For example, a crystalline elastomeric material could be distended, held in the distended state and subjected to refrigeration to "freeze" it in its distended state. This article could then be provided with a fusible insert which would become fluid at, say, room temperature. Such an article would then operate according to the present invention merely by exposure to room temperature.

Still further, the fusible insert of the present invention may be such that it is capable of becoming fluid at the same temperature as that required to cause the recoverable member to change dimension, or it may be capable of becoming fluid at either a higher or lower temperature than that required to cause the recoverable member to change dimension. Where the fusible material comprises a thermosetting material, the heat may also cause this material to harden as well as causing it to become fluid.

The induction heating used in the practice of the present invention may be any type of high frequency heating.

The articles of the present invention have many uses other than those previously described. For example, the fusible material may function to cause a bond to be formed, to fill voids, to release a spring or other similar element, as a dam to prevent the flow of another fluid, etc. The force exerted by the recoverable member may function to move another object, to cause a secure bonding, to release a diaphragm which closes or opens a conduit, etc.

Having fully described the present invention, it is to be understood that it is not to be limited to the specific details set forth, but is of the full scope of the appended claims.

I claim:

1. A heat recoverable article comprising a recoverable member and a fusible member having a fusion temperature, said recoverable member comprising crystalline elastomeric material which has been distended from an original state and, frozen and maintained in the distended state by refrigeration, said fusible member being in abutting relation with said recoverable member, the fusion temperature of said fusible member being lower than the temperature at which said elastomeric material possesses elastic properties, wherein said recoverable member, upon the removal of said refrigeration for a time sufficient to permit said recoverable member to warm to the temperature where the elastomeric material possesses elastic properties, recovers from its distended shape in a direction towards it original shape and urges said fusible member in the direction of recovery of said recoverable member.

2. The article of claim 1 wherein said crystalline elastomeric material and said fusible insert are tubular.

3. An article according to claim 2 wherein said recoverable member has a continuous homogenous wall.

4. A recoverable tubular article comprising a recoverable member and a fusible member, said recoverable member and said fusible member being in abutting relation, said recoverable member being a split cylindrical spring, said fusible member being a rigid member which holds said spring in a distended state and being exposed and free to come into contact with a substrate, said recoverable member, upon the application of heat sufficient to cause said fusible member to become fluid, urging said fusible member in the direction of recovery of said recoverable member and toward said substrate.

5. A heat recoverable article comprising a recoverable member and a fusible member, said recoverable member being a split cylindrical spring, said fusible member being in the form of a cylindrical tube placed within the cylindrical spring and contacting the inner walls of the spring to hold it in a recoverable position.

6. A heat recoverable article for use in making a composite article with a substrate, comprising a tubular recoverable member deformed from an original state toward which it recovers and a fusible member in abutting relationship with the walls of said tubular member and within the direction of recovery thereof, said recoverable member being held in the recoverable condition by said fusible member only, said recoverable member, upon the application of heat sufficient to cause said fusible member to become fluid, urging said fusible member in the direction of recovery of said recoverable member, said recoverable member acting to retain at least a portion of said fusible member between itself and a substrate inserted into it so that a bond will be formed therebetween.

7. An article according to claim 6 wherein said recoverable member has a continuous homogenous wall.

* * * * *